United States Patent [19]

Hottel et al.

[11] Patent Number: 4,707,560

[45] Date of Patent: Nov. 17, 1987

[54] THERMOPHOTOVOLTAIC TECHNOLOGY

[75] Inventors: Hoyt C. Hottel, Winchester; Robert E. Nelson, Weston; C. Robert Parent, Westwood, all of Mass.

[73] Assignee: TPV Energy Systems, Inc., Waltham, Mass.

[21] Appl. No.: 944,419

[22] Filed: Dec. 19, 1986

[51] Int. Cl.[4] .............................................. H02N 6/00
[52] U.S. Cl. .................................................... 136/253
[58] Field of Search ......................................... 136/253

[56] References Cited

U.S. PATENT DOCUMENTS

| | | | |
|---|---|---|---|
| 3,331,707 | 7/1967 | Werth | 136/253 |
| 3,433,676 | 3/1969 | Stein | 136/253 |
| 4,584,426 | 4/1986 | Nelson | 136/253 |

OTHER PUBLICATIONS

White, et al., "P-I-N" Structure for Controlled Spectrum Photovoltaic Converters Advisory Group for Aerospace Research and Devel. North Atlantic Treaty Org., pp. 897–922.

Kittl, et al., "Design Analysis of TPV-Generator Systems", Proc., 25th Annual Power Sources Conf., (1972).

Guazzoni, et al., "Cylindrical Erbium Oxide Radiator Structures for Thermophotovoltaic Generators", R&D Technical Report ECOM-4249, pp. 1–27 (1974).

Primary Examiner—Aaron Weisstuch

[57] ABSTRACT

A thermophotovoltaic system includes structure defining a diffusion flame burner having separate but adjacent fuel and oxidant inlets, and structure defining a combustion chamber in which an emitter structure is disposed for exposure to combustion products of the burner. The combustion products heat the emitter structure and cause the emission of spectrally distributed radiation. Disposed in optically coupled relation to the emitter structure are one or more photocells for converting energy radiated by the emitter structure to electrical energy, a close match between the spectrum of the photon energy radiated from the emitter structure and the electron production threshold of the photocell array resulting in enhanced efficiency. One portion of the combustion product stream is flowed from the combustion chamber through a recuperator to heat the incoming oxidant, and another portion of the combustion product stream is flowed into the combustion chamber. Significant efficiency improvements are achieved by the recuperative preheating of oxidant, and the reintroduction of a part of the exhaust gas back into the combustion mixture reduces the flame temperature with minimal compromise of the gain in efficiency achieved through oxidant preheat so that thermal stability limits of one or more of the components of the system are not exceeded.

62 Claims, 7 Drawing Figures

THERMOPHOTOVOLTAIC TECHNOLOGY

This invention relates to thermophotovoltaic TPV technology, and more particularly to thermophotovoltaic generation systems in which thermal energy is supplied by the combustion of common fossil fuels.

Thermophotovoltaic technology involves energy conversion in which energy radiated by an incandescent emitter is converted to electrical energy by a photovoltaic cell. The thermophotovoltaic process involves a two-step thermal to radiant and radiant to electrical energy conversion process. A number of TPV generator systems have been proposed, including the TPV system disclosed in Nelson U.S. Pat. No. 4,584,426 which employs a rare earth metal oxide emitter that radiates strongly over a narrow spectral band corresponding to the band gap of a photovoltaic cell optically coupled to the emitter. By matching the spectral output of the emitter with the band gap of the photovoltaic material, efficiency can be improved.

Among the parameters that can be varied is the temperature of the emitter material, subject to certain constraints, principal of which are the thermal properties of the material from which the emitter is constructed. For example, ytterbia melts at 2708K and rapid sublimation would occur at a few hundred degrees lower emitter temperature to unacceptably limit the lifetime of an ytterbia emitter. Accordingly, it is preferred to limit the emitter temperature of ytterbia emitters to the range of about 1,800–2,100K.

In accordance with one aspect of the invention, a thermophotovoltaic system is provided that includes structure defining a diffusion flame burner having separate but adjacent fuel and oxidant inlets, and structure defining a combustion chamber in which an emitter structure is disposed for exposure to combustion products of the burner. The combustion products heat the emitter structure and cause the emission of spectrally distributed radiation. Disposed in optically coupled relation to the emitter structure are one or more photocells for converting energy radiated by the emitter structure to electrical energy, a close match between the spectrum of the photon energy radiated from the emitter structure and the electron production threshold of the photocell array resulting in enhanced efficiency. One portion of the combustion product (flue gas) stream is flowed from the combustion chamber through a recuperator to heat the incoming oxidant, and another portion of the combustion product stream is drawn into the combustion chamber. Because of the uniquely high exhaust temperatures of a TPV device, sizable efficiency improvements are available by the recuperative preheating of oxidant. However, since flame temperature also increases with oxidant preheat, the thermal stability limit of one or more of the components of the system may be exceeded at higher feasible levels of recuperation. Reduction of flame temperature by the reintroduction of a part of the exhaust gas back into the combustion mixture involves minimal compromise of the gain in efficiency achieved through oxidant preheat.

In accordance with that aspect of the invention, oxidant preheat is provided by combustion product recuperation and a fraction of the combustion product stream is recirculated back to the combustion chamber. In further explanation, consider a first (base) case in which fuel and air enter the combustion chamber at room temperature (no air preheat) and with air/fuel ratio at its optimum value for thermophotovoltaic power generation. Combustion occurs and, assuming it is well stirred and complete before contact with the emitter mantle, the combustion product gases have the same enthalpy as the entering fuel, and have a temperature termed the adiabatic flame temperature $T_{AF}$. After discharge from the emitter structure, the combustion product gas temperature has dropped to $T_E$, very close to the temperature of the emitter structure, and a fraction $\delta$ of the fuel or combustion-product enthalpy has been given up. Assuming conditions have been optimized for production of electricity, any modification of operating conditions by adding air preheat or combustion product recirculation should leave the combustion product gas composition, enthalpy, and flow rate in the combustion chamber—and therefore the adiabatic flame temperature—unchanged. The flow through the chamber and the emitter structure may be considered as divided into two fractions $[1/(1+r)]$ and $[r(1+r)]$. After flow from the emitter structure, the fraction $[1/(1+r)]$ of the exit gas goes to the recuperator and the fraction $[r/(1+r)]$ is recycled back to the input of the chamber. The ratio of the two streams, r, may be termed the recycle ratio. Only the part $[1/(1+r)]$ is associated with entering fresh fuel. The temperature of the recycle gas drops further from $T_E$ to $T_E'$ by convective loss as it flows to the chamber reentry point, and its energy expressed as a fraction of that of fresh fuel, has changed from $(1-\delta)$ to $(1-\delta')$. To match the base case and keep the electric power production unchanged, the enthalpies of the streams entering the chamber, expressed as fractions of that of a unit of fresh fuel, must add to unity. The recycle gas stream contributes $[r(1+r)]$ times $(1-\delta')$, and assuming the fuel contributes $[1/(1+r)]$, the preheated air must contribute the rest. That amounts to $[r\delta'/(1+r)]$. Let one unit of air flow be defined as that associated with one unit of fresh fuel. Then, since the preheated air flow rate is $[1/(1+r)]$, one unit of air flow must contain enthalpy $r\delta'$. With exit temperature $T_E$ measured, the change to $T_E'$ can be computed by heat-transfer considerations, and $\delta'$ can then be computed. The efficiency of the system, expressed as a ratio to the base-case efficiency, is the ratio of base-case fuel input to modified fuel input, or $(1+r)$.

The above discussion indicated a reduction in performance due to the change in fractional energy transfer, from $\delta$, measuring transfer to the emitter structure to maintain its radiation, to $\delta'$, measuring both the useful emitter radiation and the energy loss from the recycle gases in their passage from emitter to point of reentry to the combustion chamber. In a well-engineered design the temperature drop in the gases from emitter to point of reentry will be of the order of 200K.

Consideration of the constraints on achieving a high r is obviously important. Although an overdesigned heat exchanger could in principle heat the air to $T_E'$, present materials of construction put a limit of about 1600K on $T_A$. $T_A$ determines $r\delta'$, and since $\delta'$ can be computed as indicated above, r becomes fixed. The thermal contributions to achieving high efficiency of electric power production thus are limited by achievable air preheat temperature $T_A$, minimized loss of energy by the recycle stream on its way to the chamber inlet (minimized($\delta'-\delta$)), and maximized permissible emitter temperature $T_E$ (and therefore $T_{AF}$, determined only by fuel type and air/fuel ratio) because the emitter's lifetime will be short if it becomes too hot. However, it is apparent that other values of $T_{AF}$ amd $T_E$ and therefore δ may be established. For example, a fraction of combustion products smaller than r may be recirculated.

Preferably, recuperation preheats the combustion air to at least about 1,000K and in a particular embodiment to about 1,600K (within capabilities of present state of the art ceramic heat exchangers), the flame temperature does not exceed about 2,300K, and exhaust gas leaves the emitter at about 2,000K and reenters the combustion chamber at about 1,800K. In particular embodiments, it is desirable to adjust the exhaust gas recirculation to keep the flame temperature at the value it would have if combustion air entered the burner at room temperature so that life of the emitter is not impaired. With a proper degree of recirculation, the air-fuel ratio, flow rate through the emitter, and flame temperature can all be kept constant. Increase in the degree of recuperation, with corresponding decreases in air and fuel flows, allows the emitter temperature and the emitted radiant power to remain constant. Efficiency enhancement by a factor of about two can be achieved with a combustion air preheat temperature of 1,200K, and by a factor of about 2.5 with a combustion air preheat temperature of 1,600K.

In particular embodiments, the emitter is a porous fabric of ceramic fibers in planar or cylindrical form. Because of the fibrous nature of such emitters, they are relatively insensitive to thermal shock (fiber bending relieves stress). The small diameter of each fiber (thirty micrometers or less) minimizes thermal stress in the diametral direction and the long thin fibers flex to reduce longitudinal stress. The thin fibers, furthermore, couple well thermally to the hot convection gases since their boundary layer is thin. Thus, the fibers are in approximate thermal equilibrium with the hot exhaust gases. Off-band emission is low due to the small optical thickness of the fibrous emitter outside the electronic absorption region. In another embodiment, the emitter structure is impermeable and defines a wall of said combustion chamber. Preferably, the emitter includes at least one oxide selected from the group consisting of erbium, holmium, neodymium, and ytterbium. A photocell of the silicon type is used with an ytterbia emitter, and a photocell of the germanium type is used with an erbia emitter.

In one particular embodiment, the burner structure is of the diffusion flame type and the first and second conduits have ports disposed in concentric relation so that the fuel jet issuing from the first conduit is mixed well by the cylindrical flow of preheated oxidant issuing from the second conduit, the oxidant and combustion product flow being such that a turbulent recirculating flow is established in the combustion chamber for stabilizing the combustion in the chamber and augmenting the rate of heat transfer to the emitter structure. The second conduit means defines at least in part a first passage extending radially inward from the cold side outlet of the recuperator structure, and the third conduit means defines at least in part a second passage extending radially inward from the annular array of outlet ports immediately adjacent and generally parallel to the first passage. The recuperator in a particular embodiment is of the counter-flow type and has a hot side inlet directly coupled to the combustion chamber outlet and a cold side outlet directly coupled to the second conduit means.

In accordance with another aspect of the invention, there is provided a thermophotovoltaic generation process that includes the steps of providing structure defining a combustion chamber with burner structure coupled to the inlet of the combustion chamber, emitter structure disposed in the combustion chamber for thermal excitation by combustion products from the burner structure, a photocell array outside the combustion chamber and in optically coupled relation to the emitter structure for producing electrical energy in response to radiation from the emitter structure, and a recuperator structure. Fuel is flowed to the burner structure, a first portion of the combustion product stream is flowed from the outlet of the combustion chamber to the recuperator structure for heating incoming oxidant, and the heated oxidant is flowed to the burner structure, and a second portion of the combustion product stream is flowed directly from the outlet of the combustion chamber to the inlet of the combustion chamber for diluting the oxidant-fuel mixture and limiting the flame temperature to protect the emitter structure. In preferred embodiments, the second portion of the combustion product stream is at least ten percent of the total combustion product flow from the combustion chamber, the incoming oxidant is heated to a temperature of at least about 1,000K, and the flame temperature is limited to about 2,300K.

In accordance with still another aspect of the invention, there is provided a thermophotovoltaic generation system that includes a combustion chamber having an inlet and an outlet, burner structure coupled to the combustion chamber inlet including an extended port array that includes a plurality of first ports and a plurality of second ports disposed in adjacent alternate relation to the first ports, first means for supplying fuel to the first ports, second means for supplying oxidant to the second ports, extended emitter structure disposed in the combustion chamber in spaced, juxtaposed relation to the extended array of alternating ports for thermal excitation by combustion products produced by flow of fuel and oxidant through the ports of the burner structure into the combustion chamber, and a photocell array outside the combustion chamber and in optically coupled relation to the emitter structure for producing electrical energy in response to radiation from the emitter structure.

In one particular embodiment, the extended port array and the extended emitter are each of planar configuration and the extended emitter structure is porous and is disposed in parallel spaced relation to the extended port array. Recuperator structure is coupled to the second means for preheating the oxidant supplied to the burner structure to a temperature of at least about 1,000K by flow of a portion of the combustion products through the recuperator, and at least ten percent of the combustion product flow from the combustion chamber is recirculated directly to the inlet of the combustion chamber for controlling the temperature of the combustion products produced by the burner. Preferably, the emitter has a thickness dimension of less than about three hundred micrometers and includes at least one oxide selected from the group consisting of erbium, holmium, neodymium, and ytterbium. A photocell of the silicon type is preferably used with an ytterbia emitter, and a photocell of the germanium type is preferably used with an erbia emitter.

Other features and advantages of the invention will be seen as the following description of particular embodiments progresses, in conjunction with the drawings, in which.

DESCRIPTION OF PARTICULAR EMBODIMENTS

Figure 1:
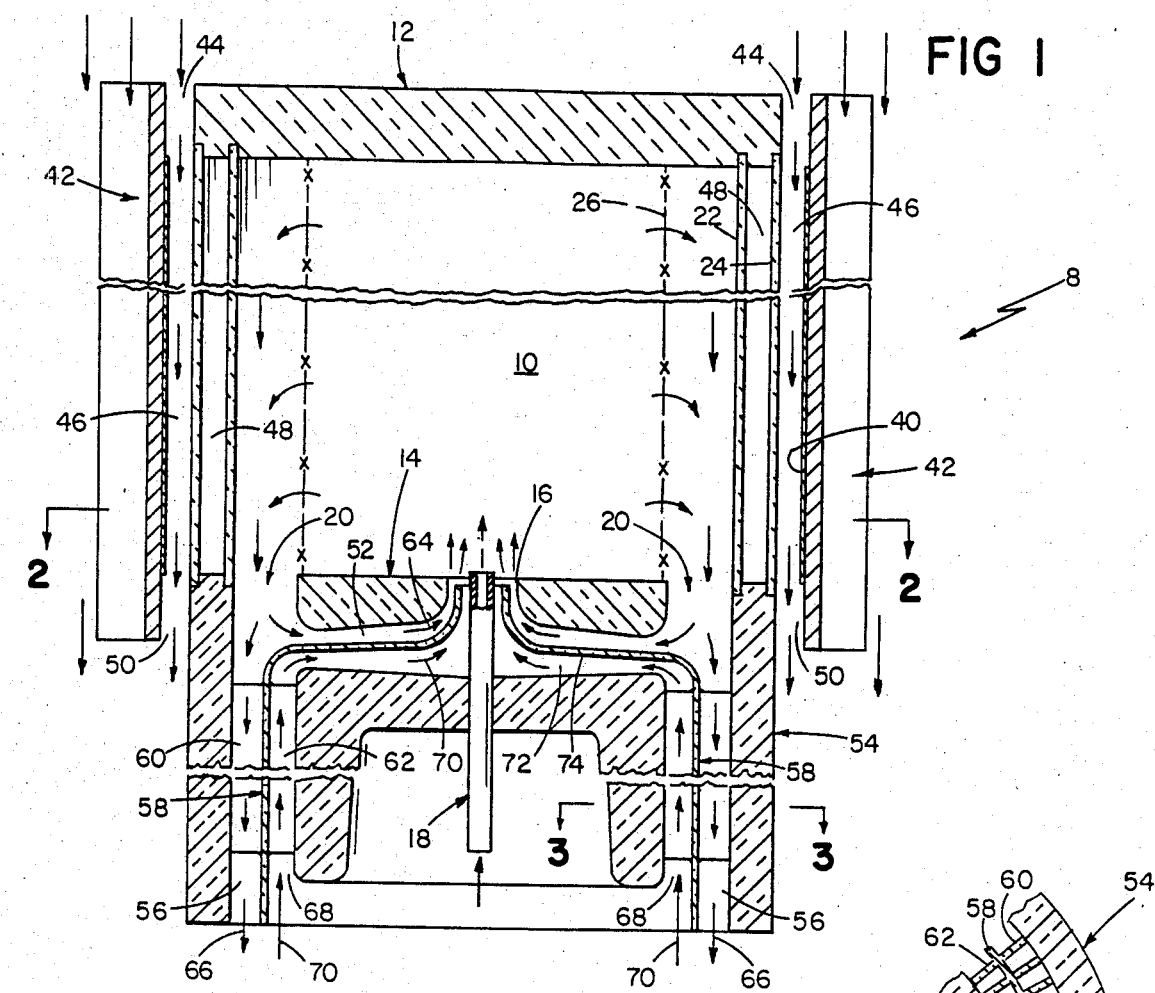
FIG. 1 is a schematic diagram of a thermophotovoltaic system in accordance with the invention.
Figure 3:
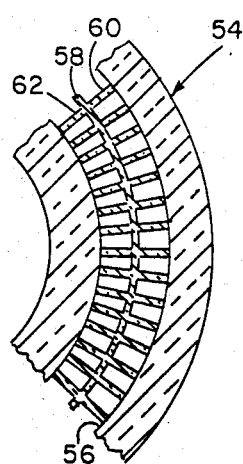
FIG. 3 is a sectional view taken along the line 3—3 of FIG. 1.
Figure 2:
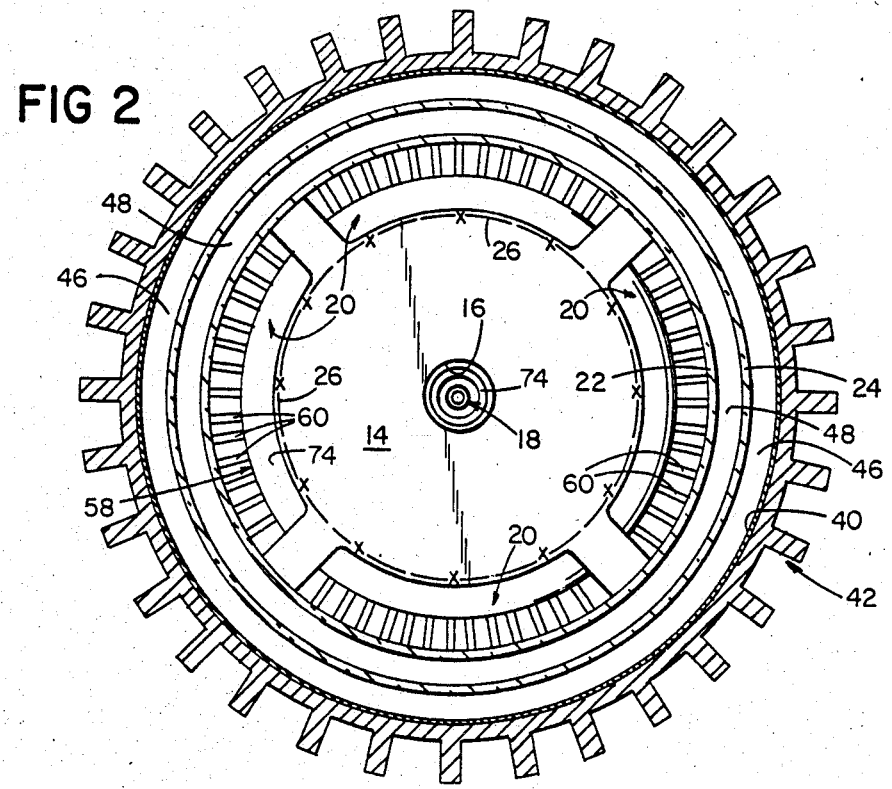
FIG. 2 is a sectional view taken along the line 2—2 of FIG. 1.

With reference to FIGS. 1-3, the thermophotovaltaic system 8 includes combustion chamber 10 that is bounded by upper ceramic (alumina-covered potassium titanate or similar material) wall 12 and lower ceramic wall 14 of zirconia or similar material that has central inlet port 16 in which fuel conduit 18 is concentrically disposed, and an annular array of exhaust ports 20. Two cylindrical transparent tubes 22, 24 of Lucalox ® (a near maximum density alumina ceramic) or other suitable material are secured between and sealed to upper and lower chamber walls 12, 14 that are spaced about one centimeter apart. Disposed within chamber 10 concentric with cylindrical window tube 22 is rare earth metal oxide fabric emitter cylinder 26, the fibers of emitter 26 having cross-sectional dimensions of about twenty micrometers and the fabric having an open area of approximately thirty percent.

Figure 4:
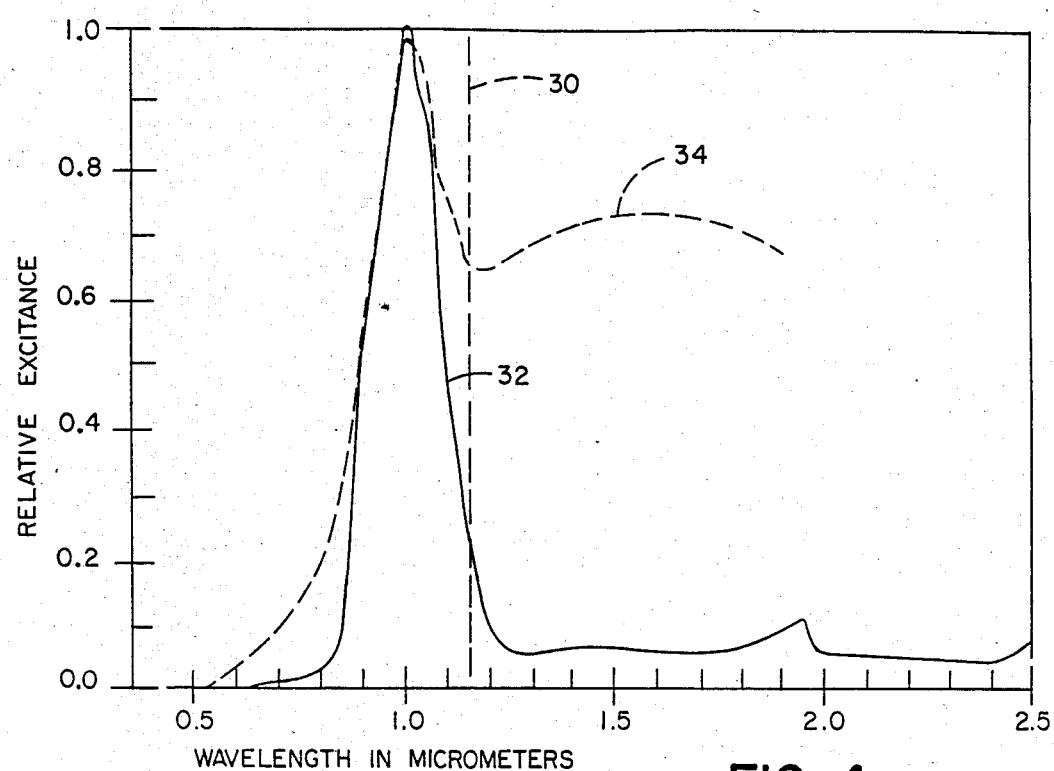
FIG. 4 is a graph of the exitance spectrum of a metal oxide emitter employed in the thermophotovoltaic generator system of FIG. 1.

Emitter 26 is manufactured in accordance with the process described in Nelson U.S. Pat. No. 4,548,426—rayon yarn fabric being immersed in an imbibing solution of a rare earth nitrate, and after centrifugation and drying, being subjected to a firing sequence in an inert atmosphere in which the fabric undergoes thermal denitration with shrinking of the emitter fabric to about one third its original dimensions. The shrunk emitter fabric is then heated in an air environment to a temperature of about 900° C. and then further heated to a temperature of about 1,500° C. to further shrink and densify the rare earth oxide fabric. The resulting rare earth oxide fabric, in visual appearance, substantially retains characteristic physical textile attributes of its precursor rayon fabric, although it is substantially reduced in dimension; has relatively high density, is flexible, and has a minimal defect microstructure. The emission of the emitter is concentrated as indicated for an ytterbia fabric in FIG. 4. As shown in FIG. 4, vertical line 30 indicates the absorption edge of silicon, curve 32 is the spectral exitance (power radiated per unit area per unit wavelength) of fibrous ytterbia emitter 26 heated to a temperature of 1,800K, and curve 34 is the spectral exitance of a sintered powder ytterbia disc of several millimeters thickness at a temperature of 1850K.

Surrounding and spaced from window cylinder 24 is cylindrical photocell array 40 that is mounted on finned heat sink structure 42. Cooling air is flowed through the annular space 46 between photocell array 40 and window cylinder 24 to provide thermal isolation between window 24 and photocell array 40. Further cooling air is flowed across the fins of the heat sink structure 42.

Formed below lower ceramic combustion chamber wall 14 are recirculation passages 52 that extend from combustion chamber exhaust ports 20 to chamber inlet port 16 and disposed below lower chamber wall 14 as an extension thereof is recuperator 54 that also communicates with combustion chamber exhaust ports 20. Recuperator 54 is a counter-current type heat exchanger that is constructed of high temperature ceramic material and has a capacity of about seven kilowatts and includes annular elongated passage 56 in which is disposed ceramic structure that includes separation cylinder 58 with radial outwardly extending fins 60 disposed on the hot (combustion product outlet) side and radial inwardly extending fins 62 disposed on the cool (air inlet) side. A first portion of combustion products is flowed through passages 52 to inlet port 16 as indicated by arrows 64 and a second portion of combustion products flows through the outlet passages across fins 60 and are exhausted from recuperator 54 as indicated by arrows 66. Combustion air is supplied through recuperator inlet 68 (as diagrammatically indicated by arrows 70) for preheating flow through recuperator 54 and discharge along passage 72 (as directed by separator member 74) for flow through port 16 into combustion chamber 10. Concurrently, fuel and pressurized air for fuel atomization are supplied through inlet line 18 and discharged into combustion chamber 10. The fuel jet issuing from nozzle 18 and the cylindrical flows 64 and 70 of recirculated combustion products and preheated air establish a turbulent recirculating flow that stabilizes the combustion in chamber 10, and the resulting combustion products flow through and heat the porous emitter to produce emission in a spectum of the type shown at 32 in FIG. 4, which emission causes the photocells 40 to produce electrical power.

In a particular embodiment, the operating point of the TPV generator 8 is about 1.5 kilowatts, fabric emitter 26 is of ytterbia fibers and has a diameter of about eight centimeters, and an axial length of about twenty-four centimeters with a surface area of about six hundred square centimeters. Atomized diesel fuel flowed at a rate of 0.44 grams per second through tube 18 and combustion air flowed at a rate of 6.97 grams per second through recuperator inlet 68 form a jet composed of a central fuel jet and a coaxial annular sheath of combustion air. To promote turbulent mixing and fuel atomization, the momentum flux of the air stream is relatively high. The length to diameter ratio of emitter 26 is such that the cone which is the theoretical locus of the half-centerline velocity of the jet intersects emitter 26 at its upper end adjacent chamber wall 12. The combination of recirculation stream 64 and preheated combustion air stream 70 causes the temperature of the resulting combustion product stream to match the temperature of the no air-preheat and no flue-gas-recycle combustion product which is found to produce the maximum safe emitter temperature (about 2100K). The generator efficency is doubled due to the preheating of the incoming air to a temperature of about 1200K. The double concentric jet also serves to establish an internal recirculation eddy which promotes uniform heating of emitter 26.

Figure 5:
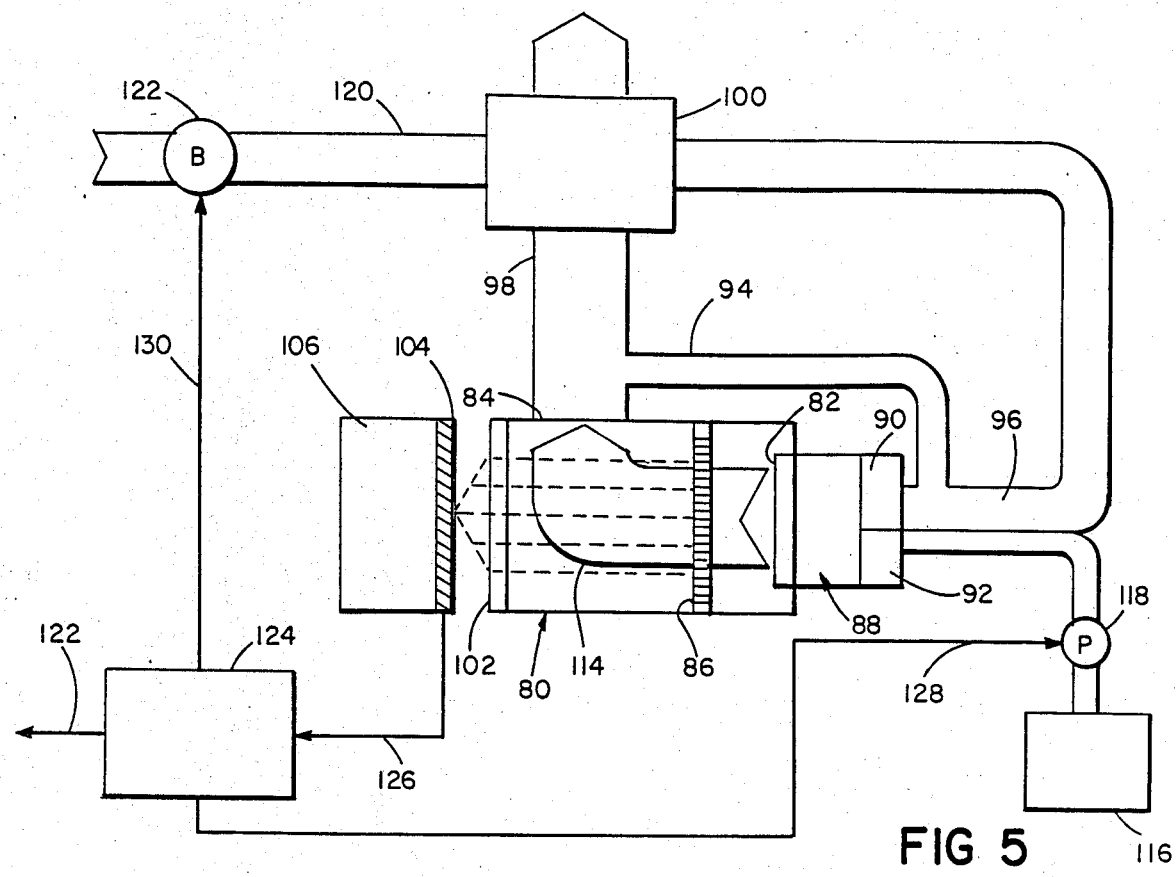
FIG. 5 is a schematic diagram of another thermophotovoltaic system in accordance with the invention.

Another thermophotovoltaic system shown diagrammatically in FIG. 5 includes combustion chamber 80 that has inlet 82 and outlet 84 and in which porous planar ytterbia fabric emitter 86 is disposed. Burner structure 88 is coupled to chamber inlet 82 and has combustion air/recirculation manifold 90 and fuel manifold 92. Coupled to combustion chamber outlet 84 are recirculation branch passage 94 that merges with combustion air passage 96, and recuperation branch passage 98 that leads to cross-flow recuperator 100. Recirculation flow is driven by entrainment in the combustion air flow. Combustion chamber 80 also has transparent Lucalox ® window 102. Disposed in optically coupled relation to emitter 86 on the opposite side of chamber window 102 is an array of silicon cells 104 that is mounted on forced air cooled heat sink structure 106.

Figure 6:
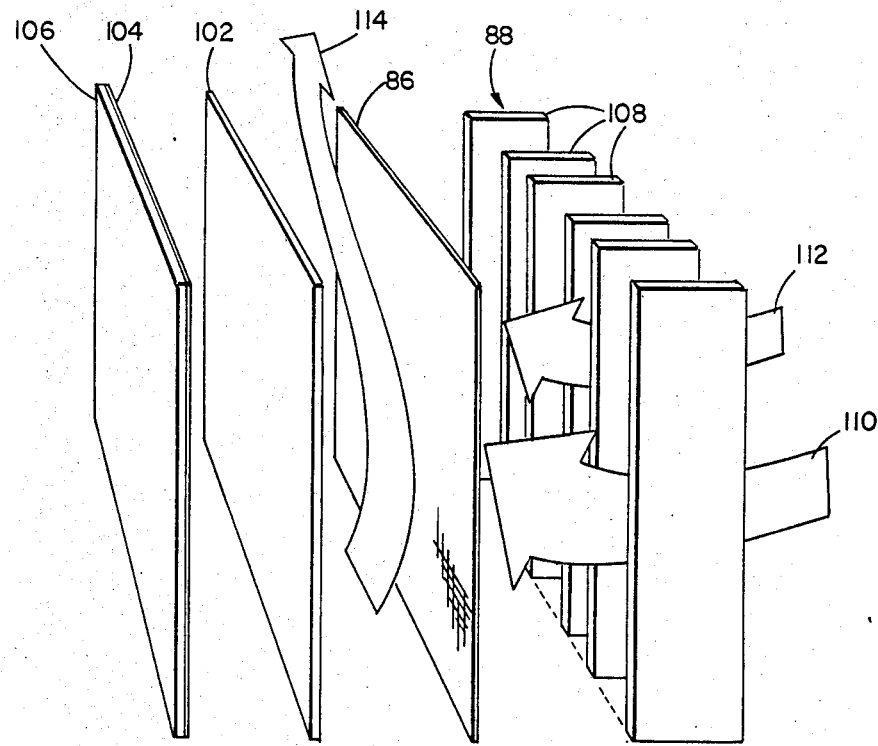
FIG. 6 is a diagrammatic view of the flat plate diffusion flame burner used in the system of FIG. 5.

Burner structure 88 includes a series of flat plates 108 (as diagrammatically indicated in FIG. 6) that define a series of parallel slots. Alternate slots communicate with air supply manifold 90, the air being flowed through slots from manifold 90 as indicated by arrow 110 while the intermediate slots communicate with fuel manifold 92, the fuel being flowed through the intermediate slots as indicated by arrow 112. Plates 108 may be constructed of high temperature ceramic material such as alumina or mullite. The flat plate diffusion burner 88 supports a turbulent diffusion flame and allows use of air preheat temperatures considerably higher than the auto ignition temperature of the fuel, as fuel and air are not mixed until they enter the combustion chamber 80. Turbulence at the boundary of the fuel and air streams augments the rate of mixing which increases the volumetric combustion rate and reduces the flame length, in turn increasing the heat transfer rate from the flame to the planar fabric emitter 86. As the length of a turbulent diffusion flame is largely independent of fuel velocity, optimal positioning of planar emitter 86 relative to the combustion zone is little disturbed by changing fuel flow rates in response to changing load demands. The spacial characteristics of the flame—a slab with its two longest dimensions defined by the dimensions of the front face of burner 88 and a thickness dimension depending principally on the width of the slots between plates 108—is well adapted to the planar emitter 86.

The ytterbia fabric emitter 86 is supported in the combustion chamber 80 in spaced parallel relation to the bases of the slots defined by burner plates 108. The mixture of combustion products from the air/recirculation and fuel flows 110 and 112 flows through the porous emitter 86 and is exhausted as indicated by arrow 114 through chamber outlet 84. In a particular system, recuperation preheats the combustion air to about 1,150K, exhaust gas reenters the combustion chamber at about 1,700K, and the resulting diluted flame temperature is about 2,000K.

With reference to FIG. 5, gaseous fuel is delivered to burner 88 from fuel tank 116 via fuel pump 118 and combustion air is flowed over line 120 by blower 122 through recuperator 100 to burner 88. A power conditioning and control unit 124 monitors the current over line 126 from photocell array 104 and provides control signals to fuel pump 118 over line 128 and to blower 122 over line 130. An output from power control unit 124 over line 132 may also be used to recharge the start up battery and to supply requirements of fuel pumps and cooling air blowers during normal system operation.

Figure 7:
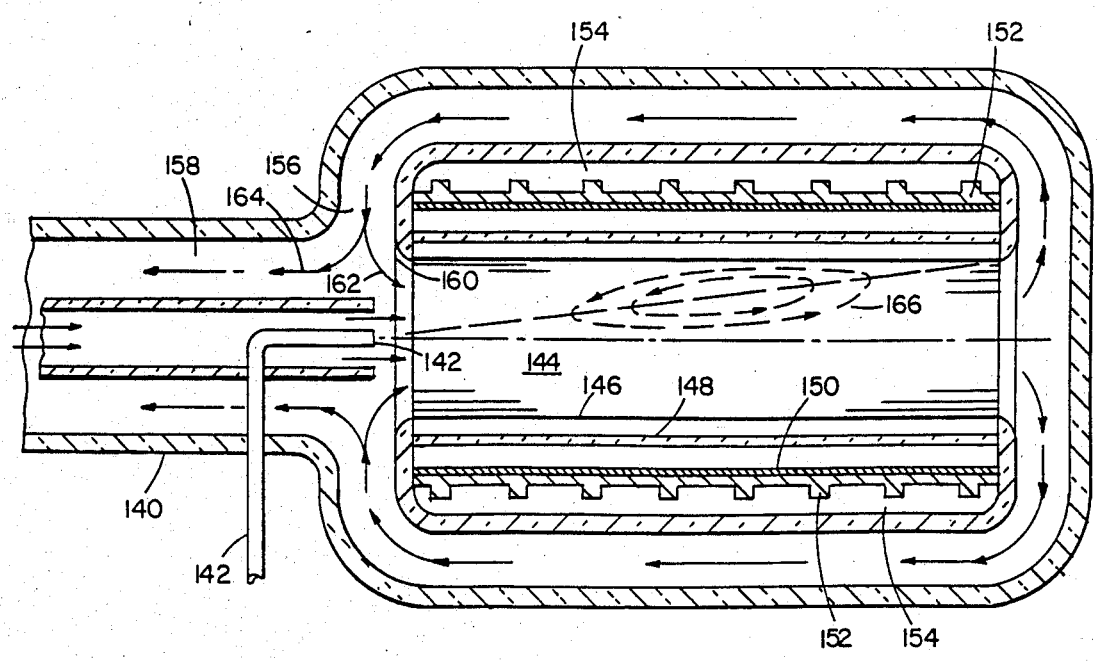
FIG. 7 is a schematic diagram of a thermophotovoltaic system in accordance with the invention using a ducted recirculation jet.

Still another thermophotovoltaic generator construction is shown in diagrammatic form in FIG. 7, that system including recuperator 140, fuel inlet conduit 142, burner housing 144 on which is mounted gas impermeable ytterbia cylinder 146 that has a thickness of about 0.1 millimeter and a surface area of about 300 square centimeters, cylindrical isolation window 148, and cylindrical photocell array 150 that is mounted on finned heat sink support 152 over which cooling air is flowed through chamber 154. Electrical power is transmitted from photocell array 150 over conductors disposed in a thermally insulated conduit. In a first process for fabricating emitter cylinder 146, a low ash content cellulosic paper was impregnated with a 1.5 molar solution of ytterbium nitrate. An ytterbium oxide ceramic replica of the paper sleeve was then formed by drying the impregnated sleeve and then heating it in a controlled atmosphere furnace to obtain thermal denitration, oxidation of the carbon, and sintering of the resulting ytterbium oxide. In a second (tape casting) process, a fine particle size dispersion of ytterbia particles in an organic binder-solvent solution was cast to a green body film with a conventional doctor blade casting machine and fired to a temperature of 1500° C. to sinter the powder into a near-theoretical density cylindrical ytterbia ceramic film.

The combustion product stream is ducted from chamber outlet 156 through passage 158, a first portion of the combustion product stream being ducted through recirculation port 160 into the burner cylinder 144 as diagrammatically indicated by lines 162. Combustion products are also flowed from outlet 156 to recuperator 140 as diagrammatically indicated by lines 164. The cylindrical array of photocells 150 is optically coupled to emitter 146 and is actively cooled. The cylindrical ytterbia film 146 functions to duct hot combustion gases. As indicated diagrammatically in FIG. 7, the fuel jet issuing from nozzle 142 and the cylindrical flows of recirculated combustion products and preheated air are confined by emitter cylinder 146, the air and combustion product flows being such that a turbulent internal recirculating flow 166 is established as indicated by the streamlines in FIG. 7. The internal recirculating flow 166 stabilizes the combustion in the chamber volume bounded by the cylindrical emitter film 146 and augments the rate of heat transfer to the emitter by increasing the volumetric combustion rate and decreasing the boundary layer thickness at the emitter film 146. In this embodiment, recuperation preheats the combustion air to about 1,200K, the flame temperature is about 2,000K, and exhaust gas reenters the combustion chamber at about 1,700K.

While particlar embodiments of the invention have been shown and described, various modifications will be apparent to those skilled in the art, and therefore it is not intended that the invention be limited to the disclosed embodiments, or to details thereof, and departures may be made therefrom within the spirit and scope of the invention.

What is claimed is:

1. A thermophotovoltaic generator system comprising structure defining a combustion chamber that has an inlet and an outlet, burner structure coupled to the inlet of said combustion chamber including first means for supplying fuel to said burner structure and second means spaced from said first means for supplying oxidant to said burner structure, emitter structure disposed in said combustion chamber for thermal excitation by combustion products from said burner structure, a photocell array outside said combustion chamber and in optically coupled relation to said emitter structure for producing electrical energy in response to radiation from said emitter structure, and third means for flowing a portion of the combustion product stream directly from the outlet of said combustion chamber to the inlet of said combustion chamber for diluting the oxidant-fuel mixture and limiting the flame temperature to a safe range as a function of the thermal stability of a component of the thermophotovoltaic generator system.

2. The system of claim 1 wherein said burner structure is of the diffusion flame type and includes port structure coupled to said second and third means and a central fuel orifice coaxially disposed in said port structure and coupled to said first means.

3. The system of claim 2 wherein said emitter structure is of cylindrical configuration.

4. The system of claim 3 wherein said emitter structure is porous.

5. The system of claim 1 wherein said emitter structure is impermeable and defines a wall of said combustion chamber.

6. The system of claim 1 wherein at least ten percent of the combustion product flow from said combustion chamber is recirculated through said third means directly to the inlet of said combustion chamber.

7. The system of claim 6 wherein said emitter structure has a thickness dimension of less than about three hundred micrometers.

8. The system of claim 1 wherein said burner structure is of the diffusion flame type and includes a plurality of fuel orifices and a plurality of combustion oxidant orifices in planar array.

9. The system of claim 8 wherein said emitter is of planar configuration and is disposed in spaced parallel relation to said planar array of fuel and oxidant orifices.

10. The system of claim 9 wherein said emitter structure is porous.

11. The system of claim 10 wherein at least ten percent of the combustion product flow from said combustion chamber is recirculated through said third means directly to the inlet of said combustion chamber.

12. The system of claim 1 wherein said emitter structure includes at least one oxide selected from the group consisting of erbium, holmium, neodymium, and ytterbium.

13. The system of claim 7 wherein said emitter structure is impermeable and defines a wall of said combustion chamber.

14. The system of claim 1 and further including recuperator structure coupled to said second means, and outlet structure coupled to said combustion chamber for flowing a second portion of said combustion products to said recuperator structure for preheating the oxidant supplied to said burner structure through said second means to a temperature of at least about 1,000K.

15. The system of claim 1 wherein said first and second means have ports disposed in concentric relation so that the fuel jet issuing from said first means is confined by the cylindrical flow of preheated oxidant issuing from said second means, the oxidant and combustion product flow being such that a turbulent recirculating flow is established in said combustion chamber for stabilizing the combustion in said chamber and augmenting the rate of heat transfer to said emitter structure.

16. A thermophotovoltaic generator system comprising
structure defining a combustion chamber having an inlet and an outlet,
burner structure coupled to said combustion chamber inlet including an extended port array that includes a plurality of first ports and a plurality of second ports disposed in adjacent alternate relation to said first ports, first means for supplying fuel to said first ports, second means for supplying oxidant to said second ports,
extended emitter structure disposed in said combustion chamber in spaced, juxtaposed relation to said extended array of alternating ports for thermal excitation by combustion products produced by flow of fuel and oxidant through said ports of said burner structure into said combustion chamber, and
a photocell array outside said combustion chamber and in optically coupled relation to said emitter structure for producing electrical energy in response to radiation from said emitter structure.

17. The system of claim 16 wherein said extended port array and said extended emitter structure are each of planar configuration and said extended emitter structure is disposed in parallel spaced relation to said extended port array.

18. The system of claim 16 and further including recuperator structure coupled to said second means,
outlet structure coupled to said combustion chamber for flowing combustion products from said combustion chamber, said outlet structure including third means of recirculating a first portion of the combustion products directly to said burner structure for stabilizing the maximum temperature of the combustion products produced by said burner structure and for flowing a second portion of said combustion products to said recuperator structure for preheating the oxidant supplied to said burner structure through said second means to a temperature of at least about 1,000K.

19. The system of claim 18 wherein at least ten percent of the combustion product flow from said combustion chamber is recirculated through said third means directly to the inlet of said combustion chamber.

20. The system of claim 19 wherein said emitter structure is porous.

21. The system of claim 20 wherein said emitter structure includes ytterbia, and said photocell is of the silicon type.

22. The system of claim 20 wherein said emitter structure includes erbia, and said photocell is of the germanium type.

23. A thermophotovoltaic generator system comprising
structure defining a combustion chamber that has an inlet and an outlet,
burner structure coupled to the inlet of said combustion chamber including first conduit means for supplying fuel to said burner structure and second conduit means spaced from said first conduit means for supplying oxidant to said burner structure,
emitter structure disposed in said combustion chamber for thermal excitation by combustion products from said burner structure,
a photocell array outside said combustion chamber and in optically coupled relation to said emitter structure for producing electrical energy in response to radiation from said emitter structure,
recuperator structure coupled to said second conduit means, means for flowing a first portion of the combustion product stream from the outlet of said combustion chamber to said recuperator structure for heating incoming oxidant to a temperature of at least about 1,000K for flow into said combustion chamber, and third conduit means for flowing a second portion of the combustion product stream directly from the outlet of said combustion chamber to the inlet of said combustion chamber for diluting the oxidant-fuel mixture and limiting the flame temperature to not exceed about 2,300K.

24. The system of claim 23 wherein said emitter structure includes at least one oxide selected from the group consisting of erbium, holmium neodymium, and ytterbium.

25. The system of claim 24 wherein said emitter sturcture includes ytterbia, and said photocell array is of the silicon type.

26. The system of claim 24 wherein said emitter structure includes erbia, and said photocell array is of the germanium type.

27. The system of claim 23 wherein said burner structure is of the diffusion flame type and includes port structure coupled to said second and third conduit means and a central fuel orifice coaxially disposed in said port structure and coupled to said first conduit means.

28. The system of claim 27 wherein said emitter structure is of cylindrical configuration.

29. The system of claim 28 wherein said emitter structure is porous.

30. The system of claim 29 wherein said recuperator is of the counter-flow type and has a hot side inlet directly coupled to said combustion chamber outlet and a cold side outlet directly coupled to said second conduit means.

31. The system of claim 30 wherein said combustion chamber defining structure includes a wall of ceramic material, said combustion chamber outlet includes an annular array of ports in said wall of ceramic material immediately adjacent one end of said emitter structure, and said recuperator structure is mounted on said wall of ceramic material in immediate communication with said annular array of outlet ports.

32. The system of claim 31 wherein said second conduit means defines at least in part a first passage extending radially inward from said cold side outlet of said recuperator structure, and said third conduit means defines at least in part a second passage extending radially inward from said annular array of outlet ports immediately adjacent and generally parallel to said first passage 33. The system of claim 23 wherein said emitter structure is impermeable and defines a wall of said combustion chamber.

34. The system of claim 23 wherein at least ten percent of the combustion product flow from said combustion chamber is recirculated through said third conduit means directly to the inlet of said combustion chamber.

35. The system of claim 34 wherein said emitter structure has a thickness dimension of less than about three hundred micrometers.

36. The system of claim 23 wherein said burner structure is of the diffusion flame type and includes a plurality of fuel orifices and a plurality of combustion oxidant orifices in planar array.

37. The system of claim 36 wherein said emitter is of planar configuration and is disposed in spaced parallel relation to said planar array of fuel and oxidant orifices.

38. The system of claim 37 wherein said emitter structure is porous.

39. The system of claim 38 wherein at least ten percent of the combustion product flow from said combustion chamber is recirculated through said third conduit means directly to the inlet of said combustion chamber.

40. The system of claim 39 wherein said emitter structure has a thickness dimension of less than about thirty micrometers.

41. The system of claim 23 wherein said recuperator is of the counter-flow type and has a hot side inlet directly coupled to said combustion chamber outlet and a cold side outlet directly coupled to said second conduit means.

42. The system of claim 23 wherein said combustion chamber defining structure includes a wall of ceramic material, said combustion chamber outlet includes an annular array of ports in said wall of ceramic material immediately adjacent one end of said emitter structure, and said recuperator structure is mounted on said wall of ceramic material in immediate communication with said annular array of outlet ports.

43. The system of claim 42 wherein said emitter structure is impermeable and defines a wall of said combustion chamber.

44. The system of claim 43 wherein at least ten percent of the combustion product flow from said combustion chamber is recirculated through said third conduit means directly to the inlet of said combustion chamber.

45. The system of claim 23 wherein said first and second conduits have ports disposed in concentric relation so that the fuel jet issuing from said first conduit is confined by the cylindrical flow of preheated oxidant issuing from said second conduit, the oxidant and combustion product flow being such that a turbulent recirculating flow is established in said combustion chamber for stabilizing the combustion in said chamber and augmenting the rate of heat transfer to said emitter structure.

46. The system of claim 45 wherein said emitter structure is of cylindrical configuration.

47. The system of claim 46 wherein said emitter is impermeable and defines said combustion chamber.

48. The system of claim 45 wherein said emitter has a thickness dimension of less than about three hundred micrometers.

49. The system of claim 48 wherein at least ten percent of the combustion product flow from said combustion chamber is recirculated directly to the inlet of said combustion chamber.

50. The system of claim 49 wherein said recuperator is of the counter-flow type and has a hot side inlet directly coupled to said combustion chamber outlet and a cold side outlet directly coupled to said second conduit means.

51. The system of claim 50 wherein said combustion chamber defining structure includes a wall of ceramic material, said combustion chamber outlet includes an annular array of ports in said wall of ceramic material immediately adjacent one end of said emitter structure, and said recuperator structure is mounted on said wall of ceramic material in immediate communication with said annular array of outlet ports.

52. The system of claim 51 wherein said second conduit means defines at least in part a first passage extending radially inward from said cold side outlet of said recuperator structure, and said third conduit means defines at least in part a second passage extending radially inward from said annular array of outlet ports immediately adjacent and generally parallel to said first passage.

53. The system of claim 50 wherein said emitter structure includes at least one oxide selected from the group consisting of erbium, holmium, neodymium, and ytterbium.

54. The system of claim 53 wherein said emitter structure includes ytterbia, and said photocell is of the silicon type.

55. The system of claim 53 wherein said emitter structure includes erbia, and said photocell is of the germanium type.

56. A thermophotovoltaic generation process comprising the steps of
providing structure defining a combustion chamber that has an inlet and an outlet, with burner structure coupled to the inlet of said combustion chamber, emitter structure disposed in said combustion chamber for thermal excitation by combustion products from said burner structure, a photocell array outside said combustion chamber and in optically coupled relation to said emitter structure for producing electrical energy in response to radiation from said emitter structure, and recuperator structure coupled to the outlet of said combustion chamber,
flowing fuel to said burner structure,
flowing oxidant through said recuperator structure to said burner structure,
flowing a first portion of the combustion product stream from the outlet of said combustion chamber to said recuperator structure for heating incoming oxidant for flow to said burner structure, and
flowing a second portion of the combustion product stream directly from the outlet of said combustion chamber to the inlet of said combustion chamber for diluting the oxidant-fuel mixture and limiting the flame temperature to a safe range as a function of the thermal stability of a component of the thermophotovoltaic generator system.

57. The process of claim 56 wherein said second portion of the combustion product stream is at least ten percent of the total combustion product flow from said combustion chamber.

58. The process of claim 56 wherein said incoming oxidant is heated to a temperature of at least about 1,000K for flow to said burner structure, and
said flame temperature is limited to not exceed about 2,300K.

59. The process of claim 56 wherein said emitter structure includes at least one oxide selected from the group consisting of erbium, holmium, neodymium, and ytterbium.

60. The process of claim 59 wherein said emitter structure includes ytterbia, and said photocell is of the silicon type.

61. The process of claim 59 wherein said emitter structure includes erbia, and said photocell is of the germanium type.

62. The process of claim 59 wherein said second portion of the combustion product stream is at least ten percent of the total combustion product flow from said combustion chamber and limits said flame temperature to not exceed about 2,300K, and said incoming oxidant is heated to a temperature of at least about 1,000K for flow to said burner structure.

* * * * *